United States Patent [19]

Wessling et al.

[11] Patent Number: 4,525,526

[45] Date of Patent: * Jun. 25, 1985

[54] SURFACE ACTIVE POLYMERIC SURFACTANTS CONTAINING SIDE CHAIN HYDROPHOBES

[75] Inventors: Ritchie A. Wessling, Midland; Dale M. Pickelman, Auburn, both of Mich.

[73] Assignee: The Dow Chemical Company, Midland, Mich.

[ * ] Notice: The portion of the term of this patent subsequent to Jan. 17, 2001 has been disclaimed.

[21] Appl. No.: 554,510

[22] Filed: Nov. 23, 1983

Related U.S. Application Data

[60] Continuation-in-part of Ser. No. 539,451, Oct. 6, 1983, which is a division of Ser. No. 272,435, Jun. 10, 1981, Pat. No. 4,426,489, which is a division of Ser. No. 123,321, Feb. 21, 1980, abandoned, which is a continuation-in-part of Ser. No. 901,924, May 1, 1978, abandoned.

[51] Int. Cl.³ ............................................. C08F 26/00
[52] U.S. Cl. .................................... 524/815; 524/547; 524/551; 524/555; 524/817
[58] Field of Search ............... 524/547, 551, 555, 815, 524/817

[56] References Cited

U.S. PATENT DOCUMENTS

| | | | |
|---|---|---|---|
| 3,068,214 | 12/1962 | Rassweiler | 525/330 |
| 3,216,979 | 11/1965 | Sexsmith | 526/293 |
| 3,917,574 | 11/1975 | Gibbs | 526/287 |
| 4,113,710 | 9/1978 | Pickelman, Sr. | 525/375 |
| 4,426,489 | 1/1984 | Wessling | 524/815 |

Primary Examiner—Christopher A. Henderson

[57] ABSTRACT

Substantially linear, synthetic, water-soluble or water-dispersible cationic interpolymeric surfactants which are particularly useful for reducing the surface tension of an aqueous medium; such surfactants having a critical micelle concentration of from 0.01 to about 10 percent in water at 25° C., a charge density of from about 1 to 5 meq/g and a number average molecular weight of from about 500 to about 40,000 and being composed of a plurality of nonionic hydrophobic units and pH independent hydrophilic cationic units randomly distributed in the backbone of such interpolymeric surfactants and wherein an average molecule of such surfactant contains from 1 to about 5 hydrophilic cationic units substituted with a pendant hydrophobic group, such hydrophobic group being an aralkyl group of from about 8 to about 20 carbon atoms are prepared by (1) aqueous, emulsion polymerization of a mixture of ethylenically unsaturated nonionic monomers at least one of which contains an ion-forming group in the presence of a copolymerizable monomeric surfactant to form a latex, (2) reacting the resulting latex with a coreactant to form a water-soluble cationic interpolymer.

3 Claims, No Drawings

SURFACE ACTIVE POLYMERIC SURFACTANTS CONTAINING SIDE CHAIN HYDROPHOBES

CROSS-REFERENCE TO RELATED APPLICATION

This application is a continuation-in-part of application Ser. No. 539,451, filed Oct. 6, 1983, pending, which is a division of application Ser. No. 272,435, filed June 10, 1981, now U.S. Pat. No. 4,426,489, which is a division of application Ser. No. 123,321 filed Feb. 21, 1980, now abandoned which is a continuation-in-part of application Ser. No. 901,924, filed May 1, 1978, now abandoned.

BACKGROUND OF THE INVENTION

The requirement for a surfactant where colloidal suspensions or emulsions are employed (e.g., in the preparation of latexes, microspheres, or in suspending agents used as antipollutants) is well recognized in the art. Further, it is desirable to utilize a surfactant having the highest adsorption efficiency attainable. One example is the use of such material in a polymer latex used to obtain coatings which are impermeable to the passage of moisture and gases, such as oxygen. In such systems, excess surfactant in the water phase of such latex interferes with the impermeability characteristics of the latex by producing exudates at the coating surface. Further, the surfactant frequently interferes with adhesion of the latex to the substrate being protected or with cohesion of the coating to itself (heat seal). Still further, coatings containing excess surfactants have a high level of water leachables which oftentimes precludes the use of such materials in applications such as food wraps.

It is not feasible in such applications to reduce the level of surfactant to avoid these problems as this results in an increase in surface tension and loss of wetting characteristics, as well as a reduction in stability of the latex against the action of shear and electrolytes.

A further requirement for a successful surfactant for use in colloidal suspensions or emulsions is the ability of such material to remain on the surface of the disperse phase of the colloidal suspension or emulsion in the presence of other formulating agents or when the colloidal suspension or emulsion is diluted or concentrated. It is the molecular structure of the surfactant and its method of attachment to the disperse phase of the colloidal suspension or emulsion which will determine the amount of surfactant required as well as the colloidal stability, viscosity and other rheological properties of the colloidal suspension or emulsion.

Prior known surfactant materials include the conventional nonpolymerizable, water-soluble cationic soaps as described, for example, in U.S. Pat. No. 3,322,737 and in *Surfactant Science Series,* Vol. 4, Cationic Surfactants, edited by Eric Jungerman, pp. 179-189 (1970), Marcel, Dekker, Inc., NY. In general, these materials are characterized by relatively low energies of adsorption and can easily be displaced or desorbed from a disperse phase in the presence of other materials having a higher energy of adsorption or by dilution of the suspension or emulsion.

Other types of prior known surfactants having somewhat greater resistance to desorption are the surface-active polymeric or polymerizable materials used for the preparation of latexes as disclosed, for example, in U.S. Pat. Nos. 3,177,172; 3,399,159 and 3,617,638; as well as the publication by Migranyan et al. [Vysokomolkulyarnye Soedineniya, Seriya B, 11, No. 8, 620–623 (1969)]. See also the review article by Cernikof [La Chimica e L'Industria, 52, 659–663 (1970)]. Basically, such prior art relates to the combination of monomeric materials formed into a polymer with an ionically substituted hydrophilic backbone to which is attached relatively long-chain hydrophobic groups such as are present in the conventionally used soaps. Yet another type of polymerized material, for use in latex preparation, are certain alkyl sulfide terminated oligomers as described in U.S. Pat. No. 3,498,943. These materials differ from the surfactants contemplated by the present invention in that they rely primarily on the hydrophobic thioalkyl end groups for adsorption onto the disperse phase of the latex. Such materials are polymeric analogs of conventional soaps having a hydrophilic head and a hydrophobic tail. Further, these polymers, when used to make latexes, yield products with high surface tension and are not representative of the interpolymeric surfactants of the present invention.

Other types of polymerized material for use in making latex are the interfacially spreading polyelectrolytes described in U.S. Pat. No. 3,965,032. These polyelectrolytes are devoid of pendant hydrophobic groups and thus are not representative of the present cationic polymeric surfactants.

SUMMARY OF THE INVENTION

The present invention is directed to substantially linear, synthetic, water-soluble or water-dispersible cationic interpolymeric surfactants and to a process for preparing the same, such surfactants being derived from the addition polymerization of one or more ethylenically unsaturated monomers and having a critical micelle concentration of from 0.01 to about 10 percent in water at 25° C., a charge density of from about 1 to about 5 meq/g and a number average molecular weight of from about 500 to about 40,000; wherein an average molecule of said cationic interpolymeric surfactant is composed of a plurality of nonionic hydrophobic units and a plurality of pH independent hydrophilic cationic units randomly distributed in the backbone of the interpolymeric surfactants and wherein a portion of such hydrophilic cationic units is substituted with a pendant hydrophobic group, said hydrophobic group being an alkyl of aralkyl group of from about 8 to about 20 carbon atoms and said portion being such that an average of from 1 to about 5 of the cationic units per polymeric surfactant molecule are so substituted. Such surfactants are particularly useful for stabilizing latexes which latexes, in turn, are especially useful as coatings for hydrophobic substrates.

The preferred process for producing the cationic interpolymeric surfactants of the present invention is also new. Such process comprises the sequential steps of:

(1) polymerizing in an aqueous emulsion, a mixture of ethylenically unsaturated nonionic monomers, at least one of which contains at least one substantially water-insensitive reactive functional group, in the presence of a copolymerizable monomeric cationic surfactant which surfactant is present in an amount at least sufficient to provide an average of from about 1 to about 5 pendant $C_8$-$C_{20}$ hydrocarbon groups per polymer molecule, thereby forming latex particles of a homogeneous interpolymer and (2) reacting the homogeneous interpolymer from (1) with a coreactant to thereby generate sufficient cationic charge on the interpolymer to render said interpolymer water-soluble.

As used herein, the term "water-insensitive" means that the reactive group does not interfere with the emulsion polymerization or react so rapidly with the polymerization medium that it is not available for desired postreactions.

DETAILED DESCRIPTION OF THE INVENTION

As described hereinbefore, the cationic interpolymeric surfactants of the present invention are composed, per surfactant molecule, of a mixture of nonionic hydrophobic units and cationic hydrophilic units as well as cationic units containing a pendant hydrophobic group.

A wide variety of nonionic hydrophobic monomers may be used to form the nonionic hydrophobic units, depending on the number and kind of ionic groups present in the surfactant molecule. Such nonionic units may be defined as being formed from any copolymerized ethylenically unsaturated monomer which, when in the form of a homopolymer, is less than about 0.1 percent soluble in water and wherein said monomer has no substituent extending more than about 10 Angstroms (Å) from the point of ethylenic unsaturation. The following are exemplary of preferred monomers: acrylonitrile, methacrylonitrile, methyl acrylate, methyl methacrylate, n-butyl methacrylate, butyl acrylate, hexyl acrylate, dibutylmaleate, styrene, vinyl toluene, vinyl chloride, vinyl acetate, vinyl propionate, ethyl vinyl ether, butyl vinyl ether and t-butylstyrene. Such nonionic hydrophobic units are randomly distributed in the backbone of the prescribed interpolymeric surfactant.

The substituents on the nonionic hydrophobic units include the following groups: lower alkyl, aryl, substituted aryl, lower alkyl esters and ethers, lower carboxylic acid esters (alkanoyl), lower alkyl amides, cyano, halo, haloalkyl, alkaryl or aralkyl of up to about 10 carbon atoms, and other such nonionizable groups, excluding hydroxyl and carboxamide. The cationic hydrophilic units are formed from copolymerizable ethylenically unsaturated monomers which when in the form of an amorphous homopolymer are soluble in water and remain substantially ionized over a pH range of from 0 to 14.

A wide variety of cationic monomers may be employed in preparing such cationic hydrophilic units (e.g., those monomers having phosphonium groups, quaternary ammonium groups, sulfonium groups, pyridinium groups and isothiouronium groups). These monomers may be defined as being any ethylenically unsaturated ionic monomeric unit (i.e., repeat unit in the polymer chain) which when in the form of a homopolymer is water-soluble. This includes: vinyl-substituted quaternary ammonium salts (e.g., N,N,N-trimethyl-N-methacryloxyethyl ammonium chloride; N,N,N-trimethyl-N-methacryloxy(2-hydroxypropyl)ammonium chloride) and vinylbenzyl dialkyl or mixed alkyl and hydroxy alkyl sulfonium salts. The cationic units containing a pendant hydrophobic group are formed from a copolymerizable ionic ethylenically unsaturated monomer. These monomers may be defined as ethylenically unsaturated ionic monomers which have a charge density of from about 2 to about 5 meq/g and which, while in the monomeric state, dissolve in water to form micellar solutions. Typically, the side chain hydrophobe is an alkyl or aralkyl group of 8 to 20 carbons. These materials are referred to in the art as polymerizable surfactants or soaps. The polymerizable soaps which may be used in the preferred process of the present invention are described in U.S. Pat. Nos. 3,637,432; 3,640,922; 2,772,310; 3,780,092; 3,714,256; 3,078,259 and 3,544,532. Specific examples include:

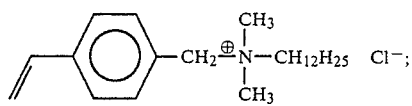

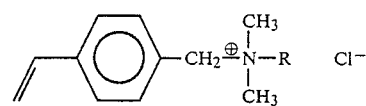

where R = hydrocarbon residue of soya amine;

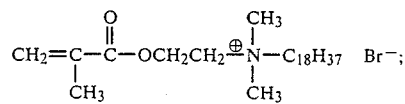

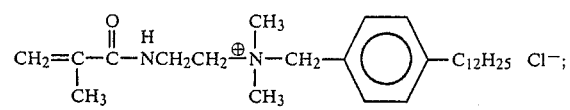

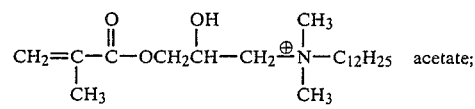

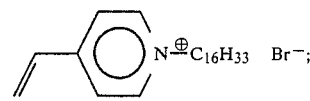

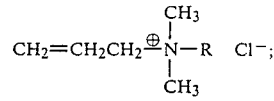

where R = hydrocarbon residue of soya amine;

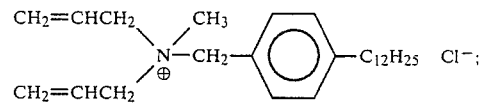

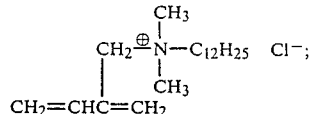

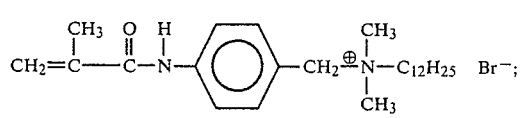

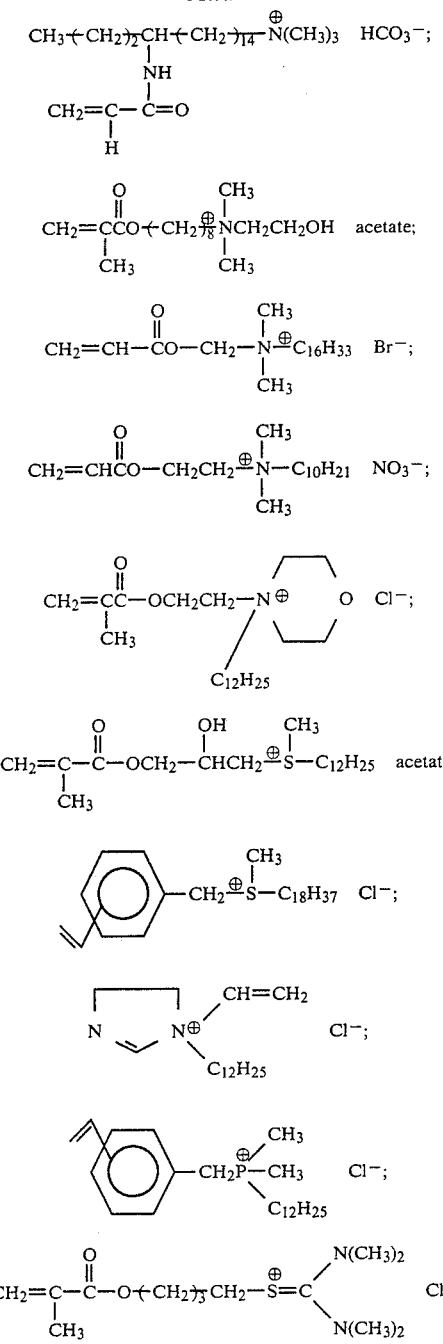

The selection of the counter-ion in the above materials (i.e., the anion) is not critical with the exception that the counter-ions must be water-soluble and not destabilize the emulsion. Therefore, multivalent or very hydrophobic ions are not particularly desirable. Fluoride, chloride, bromide, hydroxide, nitrate, lactate, acetate and bicarbonate are preferred.

Molecular weight is a critical property since it affects both the surface tension and the ability of the interpolymeric surfactant to adsorb on the substrate. Number average molecular weights up to about 40,000 are usable under certain circumstances. Normally, the higher molecular weight interpolymeric surfactants are not useful in emulsion polymerization because they cause thickening and waste promotion (as a result of the slow kinetics of adsorption). They can, however, be added to a dilute preformed latex which can then be concentrated for subsequent use. However, molecular weights of less than about 10,000 and preferably less than about 7,500 are preferred.

The minimum molecular weight is determined in part by performance but also by the limitations of processes for making them. If molecular weight is less than about 500, the interpolymeric surfactant begins to behave more like a conventional surfactant and the advantages of the polymeric nature are lost, but it is very difficult to make polymers of molecular weight as low as 500 without using large amounts of expensive chain-transfer agents or initiators. The optimum molecular weight both for ease of preparation and performance is therefore in the range of from about 1,000 to 7,500. The surface tension of aqueous solutions of the interpolymeric surfactants is dependent upon the molecular weight of the surfactants, the number and size of pendant hydrophobic groups per molecule and the charge density. Generally, at least 1 and in some cases up to about 5 (but preferably 1 or 2) pendant hydrophobic groups are needed per molecule. This means that at higher molecular weights, e.g., about 10,000 to about 40,000, only a low concentration, as weight percent, is needed to render the polymeric surfactants low in surface tension. On the other hand, if the molecular weight is low, e.g., from about 500 to about 10,000 or about 1,000 to about 7,500, then the concentration of pendant hydrophobic groups must be higher to get from 1 to about 5 (preferably 1 or 2) per molecule.

Surface activity in a given polymer is determined in part by charge density. The polymers containing ionic groups which are strong bases or salts thereof remain essentially completely ionized over the entire pH range 0 to 14. This is in contrast to the polymers containing weak base groups or their derived salts which are ionized to varying degrees depending upon pH. The charge density of such surfactant is pH dependent and they are not examples of this invention.

The interpolymeric surfactants of this invention are those whose surface activity is relatively independent of pH. These include the class of polymers wherein the ionic substituent of the hydrophilic unit is a strong base or a salt derived therefrom. Especially preferred are the polymers containing the trialkylaminoalkyl ester or amide groups, the benzyltrialkyl or hydroxy alkyl ammonium groups and the benzyldialkyl sulfonium groups.

The continuous phase of solutions or dispersions prepared using these interpolymers is preferably water or aqueous solutions of polar organic solvents.

Other variables for selection of an "optimum" interpolymeric surfactant for a particular application include a consideration of the charge to mass ratio (charge density) in the interpolymer chain, e.g., as the number of charges on a molecule increases, such molecule tends to change from an oil-soluble to a water-soluble material. In between lies a region in which the surfactant is dispersible or soluble in water and exhibits surface activity. Molecules with a sufficiently high charge are water-soluble regardless of molecular weight and molecules with a very low charge to mass ratio are not dispersible in water. Generally, surfactants having a charge density of from about 1 to 5 milliequivalents (meq) per gram are preferred.

The charge density required to render the interpolymer surface active depends strongly on the number and size of the pendant hydrophobic groups and on the polarity of the backbone hydrophobic sequences, e.g., sequences made up of relatively polar units like acrylonitrile, require less charge to achieve optimum surface activity in an aqueous dispersion. On the other hand, a polymer containing nonpolar sequences like styrene will require proportionately more ionic or hydrophilic units to achieve the same level of activity. In some cases, it is advantageous to employ small amounts (e.g., usually less than about 15 weight percent and preferably from 0 to about 5 weight percent based upon the weight of the polymeric surfactant) of very hydrophilic but not ionic comonomers for control of the surface activity and water solubility of the interpolymeric surfactant without having to use more of the ionic comonomers. Acrylamide, methacrylamide, hydroxyethyl acrylate and hydroxypropyl acrylate are particularly useful for this purpose.

The nature of the hydrophobic sequences is important also because it influences the extent of adsorption by interacting with the surface of the disperse phase. An interpolymer with nonpolar sequences absorbs better on a nonpolar surface. Interpolymers with more polar hydrophobic sequences are necessary to get optimum adsorption on a polar substrate.

The pendant hydrophobic groups have an especially strong influence on the tendency of the interpolymer to form micelles and to nucleate particles in emulsion polymerization. In addition, it has also been found that the presence of even a very small number of such groups (e.g., an average of as little as 1 or 2 per polymeric surfactant molecule) has a very pronounced and beneficial effect of reducing the surface tension of aqueous solutions of such interpolymer surfactants. One hydrophobic group per chain is sufficient to alter the behavior of the polymer and up to 5 such groups are beneficial. However, as has been hereinbefore noted, the presence of 1 or 2 of such pendant hydrophobic groups per surfactant molecule is preferred. Moreover, it should be further noted that the use of an excessive number, e.g., where most of the ionic sites are thus substituted, may impart water insolubility to the resulting polymer and thereby cause it to be unsuitable for the purposes of the present invention.

The size and number of pendant hydrophobic groups are important but the method of attachment to the backbone is also critical. The hydrophobic group must be attached to the backbone through an ionic unit in order to produce the desired effect. Pendant groups attached directly to the backbone as, for example, in octadecyl methacrylate units, do not impart the desired properties of better micellization and lower surface tension of the polymer solutions.

Another important factor is the flexibility of the interpolymer chain. When adsorbed, it must be able to spread at the interface to be effective in this application. Chain flexibility is determined in part by interaction of the interpolymer with the continuous phase but mainly by its chemical composition and structure. Polymers with rigid chains have high glass transition temperatures and low solubility and are unsuitable for the present invention. Cellulosic derivatives are illustrative of this class. Preferred are polymers with flexible chain backbones. Exemplary of this class are the random copolymers of ethylenically unsaturated monomers which have a simple carbon chain backbone.

Various methods may be used to make interpolymers of nonionic and ionic monomers. Both solution and emulsion processes can be employed. The reaction can be batch, semi-continuous or continuous. The batch polymerization of vinyl monomers normally leads to a broad composition distribution when carried out to high conversion because of the unequal reactivities of the various monomers. Batch reactions to high conversion can be used only when the reactivity ratios of the respective monomers are near unity. Interpolymers of monomers with widely differing reactivity can be prepared by limiting batch reactions to low conversions, i.e., less than about 50 percent conversion. The exact allowable conversion depends upon $r_1$ and $r_2$. One method is to make the interpolymer in a process which generates a constant composition or narrow composition distribution. This includes continuous polymerization where the monomers are passed through a pipe reactor. The polymer is recovered and unused monomer recycled and replenished with the more reactive component to maintain constant composition.

An alternative method is to produce the polymers in a continuous monomer addition (also known as semi-continuous) polymerization process. In this case, the ingredients are metered into the reactor such that the rate of monomer addition controls the rate of polymerization. Under these conditions, monomer is consumed as fast as it enters the reactor thereby eliminating monomer buildup and composition drift and the polymer formed has the same composition as the feed.

Since, in many cases, the hydrophilic and hydrophobic monomers are incompatible either alone or in common solvents, the first requirement is to select a compatibilizing reaction medium. These solvents which are substantially soluble, both in water and in hydrocarbon media, are satisfactory for this purpose. Exemplary of the solvents which may be used are: methanol, dioxane, dimethyl formamide, N-methyl-2-pyrrolidone, dimethyl acetamide, dimethyl sulfoxide, tetramethylene sulfone, N-acetylpiperidine, 1,2-dimethoxyethane and a variety of glycol monoethers including: ethylene glycol phenyl ether, ethylene glycol methyl ether, ethylene glycol ethyl ether, ethylene glycol n-butyl ether, diethylene glycol methyl ether, diethylene glycol ethyl ether, diethylene glycol n-butyl ether, propylene glycol methyl ether, dipropylene glycol methyl ether, tripropylene glycol methyl ether and mixtures thereof. The glycol monoethers and dioxane are preferred by reason of ease of recovery of the resulting polymer. Hydrophilic monomers which may be handled by use of such solvents include particularly, highly ionized monomers such as trimethylaminoethyl methacrylate and relatively hydrophilic nonionic monomers, such as acrylamide.

The preferred approach to making the reactive polymeric surfactants of the present invention is to prepare a hydrophobic interpolymer containing nonionic functional units which can be later converted to hydrophilic cationic units and/or to cationic groups with pendant hydrophobic groups attached. The hydrophobic polymers are more readily prepared because of the compatibility of the components. Monomers and polymers being of similar polarity normally do not require the presence of a compatibilizing component. Illustrative of reactions which can be carried out on functionally substituted polymers to yield ionic or reactive units are the following: displacement reactions on dimethylaminoethyl methacrylate units to yield quaternary ammonium groups and addition of sulfides to the epoxide group in glycidyl methacrylate in the presence of an acid to yield sulfonium groups. Such postreactions also allow the preparation of copolymerized units which cannot be isolated in the monomeric stage or cannot be prepared in water.

Emulsion polymerization in water is the most preferred process for making interpolymeric surfactants by this method.

Emulsion polymerization offers certain advantages in addition to using water as the polymerization medium: rates of polymerization can be much higher than in a solution process and the viscosity of the reaction mixture remains low even at high polymer concentrations. Therefore, it would be highly desirable to be able to make interpolymeric surfactants by such process.

The advantages of an emulsion process can be realized by the process comprising:

(1) polymerizing in an aqueous emulsion a mixture of ethylenically unsaturated nonionic monomers, at least one of which contains at least one substantially water-insensitive reactive functional group, in the presence of a copolymerizable monomeric cationic surfactant which surfactant is present in an amount at least sufficient to provide an average of from about 1 to about 5 (preferably 1 or 2) pendant $C_8$–$C_{20}$ hydrocarbon groups per polymer molecule, thereby forming latex particles of a homogeneous interpolymer; and (2) reacting the homogeneous interpolymer from (1) with a coreactant to thereby generate sufficient cationic charge on the interpolymer to render said interpolymer water-soluble.

The number of different monomers combined in step (1) to form the reactive interpolymer is not critical to the process provided that all are nonionic and at least one contains a reactive functional group, as described above. In practice, the number of monomers is normally limited to 4 or 5 with no more than 2 containing reactive functional groups since there is little advantage in polymer properties to be gained by using more complex mixtures, but this is not a limitation to the process since any number of monomers can be combined as described above. In most cases, a single reactive functional monomer suffices to make the polymeric surfactant since its primary purpose is to provide a site on the interpolymer for forming either a hydrophilic ionic substituent or a cationic group containing a pendant hydrophobic group, but in some cases, a combination of functional groups is needed to form the desired combination of ionic groups. In other cases, a combination is desirable as, for example, when small amounts of a very reactive functional group promotes the more rapid conversion of the other in step (2).

The combination of functional monomers must be selected to avoid interfering reactions, e.g., a combination of such monomers should not be selected where one monomer yields an anionic site and the other monomer a cationic site on the resulting interpolymer. Furthermore, a nucleophilic monomer should not be combined with an alkylating monomer.

The polymerization is carried out with a mixture of nonionic monomers thus avoiding the incompatibility problem existing in a mixture containing a hydrophilic cationic component. When all components are compatible and copolymerized to form a water-insoluble polymer, the conditions of classical emulsion polymerization are realized. Polymerization occurs in or on the polymer particles but not in the aqueous phase. Since the polymer particles are the principal loci of polymerization, there are no competing simultaneous polymerization reactions leading to mixtures of products. Instead, random interpolymers of narrow composition distributions can be and are formed.

If the reactivity ratios are favorable, the emulsion polymerization can be carried out batchwise to high conversion. In cases where the reactivity ratios are not favorable, composition drift would result at high conversion. To avoid this and obtain narrow composition distribution, the monomers can be metered into the reaction at the rate at which they are converted to polymer.

The essential ingredients in an emulsion polymerization reaction are monomers which form water-insoluble polymers, emulsifiers and initiators. The choice of ingredients and their proportions in the recipe determine the characteristics of the reaction and the product.

It is important in the process to carry out the polymerization at the highest possible rates to minimize contact of the reactive functional monomers with the hot aqueous environment. This can be accomplished by combining low organic/aqueous phase ratio, high surfactant level, high initiator level and high temperature. These conditions lead to a fluid latex and very high conversions with short reaction times. The polymer formed is of low molecular weight and narrow composition distribution. Polymers of low molecular weight, e.g., about 500 to about 40,000, and preferably less than about 10,000 (especially from about 1,000 to about 7,500), are especially useful because of their faster kinetics of adsorption. In many applications, such as in emulsion and suspension polymerization, this is very important.

The surfactants are critical to the process. The polymerizable soap, after reaction, becomes part of the polymeric surfactant and contributes side-chain hydrophobic groups to the structure. Further, the product is devoid of other surface-active species which may interfere with subsequent use of the interpolymeric surfactant. The amount of polymerizable soap used is normally in the range of from about 0.5 to about 10 weight percent depending upon the molecular weight of the interpolymer form. This results directly in the incorporation of from 1 to about 5 pendant hydrophobic groups per polymer chain attached through the cationic site.

The cationic emulsion polymerization process can also be carried out with combinations of a cationic interfacially spreading polyelectrolyte (U.S. Pat. No. 3,965,032) with a conventional cationic surfactant and sometimes (optionally) nonionic surfactants as described in U.S. Pat. No. 4,113,710, but this approach yields a polymeric surfactant which contains small amounts of the other emulsifiers which are not desirable in some applications.

Free radical-forming initiators suitable for the preparation of cationic interpolymers include those which form either nonionic or cationic end groups on the polymer chains. The nonionic types such as hydroperoxides and azo compounds are preferred, especially hydrogen peroxide, t-butylhydrogen peroxide (TBHP) and azobisisobutyronitrile. They are employed at high levels, e.g., from about 0.5 to 5 weight percent, and can be added in one shot or introduced continuously into the reaction depending on the reactivity of the initiator. Redox systems which can function in a cationic emulsion polymerization, such as TBHP and hydroxylamine, may also be utilized.

Molecular weight is a complex function of many variables but in this process, it can be controlled by choice of temperature, initiator level and chain transfer agent. Polymerization can be carried out using temperatures of from about 25° to 100° C. but temperatures of from about 50° to 80° C. are preferred for most monomers. This results in run times of less than about 12 and usually less than about 5 hours with conversions exceeding about 95 percent. The selection of chain transfer agent is also important. Most conventional chain transfer agents can be used, with alkyl polyhalides and mercaptans being preferred. Examples are $CHBr_3$, $CCl_4$, $CBr_4$, $CH_3-CH_2-Br$, alkyl mercaptans of 1 to 12 carbons, thiophenol and hydroxyalkyl mercaptans. Combinations of $H_2O_2$ with $CBr_4$ or mercapto ethanol are especially preferred.

An advantage of the present process is that particle size control is not necessary save only that the latex remains fluid enough to stir. It is also preferred to operate at relatively low solids, e.g., less than about 30 percent solids and preferably from about 20 to 25 percent solids. Small particle size, e.g., less than 2000 Å, is preferred since this gives higher rates of polymerization and allows for faster conversion in step (2); however, any particle size or particle size distribution is acceptable. Even small amounts of coagulum can be tolerated since in step (2), all species are ultimately converted to water-soluble products.

The preferred process contemplated by this invention unexpectedly leads to narrow molecular weight distribution at low molecular weights. In fact, the distributions are virtually identical to those obtained in a solution process using the same monomers. By choice of initiator, chain-transfer agent and polymerization conditions the number average molecular weight can be varied from about $10^3$ to $10^5$ with $\overline{M}_w/\overline{M}_n$ in the range of about 1.5 to 3.

In step (2), the aqueous emulsion of step (1) is converted to an aqueous solution of polymeric surfactant. Any reaction between an added low molecular weight component and the functional groups on the polymer chain that takes place in aqueous media to yield an ionic pH independent site on the polymer chain, can be employed. Exemplary are the class of nucleophilic displacement reactions between a nonionic nucleophile and nonionic alkylating agent to yield an organic cation as illustrated below:

$$RA + Z \rightarrow RZ^+ A^-$$

where Z is a nucleophile, RA is the alkylating agent and A is a leaving group. $RZ^+$ is the derived onium cation and $A^-$ its anion formed from the leaving group. Either reactant can be a substituent on the polymer chain and its counterpart coreactant is selected so as to yield a cationic polymeric product. It is, therefore, possible to make the same cationic product from these two different routes.

Nonionic monomers which form interpolymers with nucleophilic sites include the general classes of tertiary amines, phosphines and sulfides containing at least one polymerizable double bond as a substituent. Examples include vinyl pyridines, vinylbenzyl dialkylamines, dialkylaminoalkyl acrylates and methacrylates and amides and alkylthioalkyl acrylates and methacrylates.

Mixtures of interpolymer latexes with the desired alkylating agent are allowed to react at from ambient temperature to about 100° C., or higher if under pressure, to convert the nucleophilic sites to attached onium ions. As the reaction proceeds, the polymer particles become increasingly hydrophilic and eventually dissolve to form an aqueous solution. After reaction, the reaction product can be used as is or given other treatments such as stripping to remove unreacted alkylating agents.

The alkylating agents are selected to be highly reactive and volatile and must be at least slightly soluble, e.g., more than 0.001 percent, in order to diffuse through the aqueous phase to the latex particles. Preferred alkylating agents include alkyl bromides of 1 to 4 carbons, allyl and methallyl chlorides, benzyl chlorides and dimethyl sulfate.

Preferentially, the alkylating site may be placed on the polymer chain by using an active halogen-containing comonomer of the classes: vinyl aralkyl halides, haloalkyl butadienes, bromoalkyl acrylates and methacrylates and vinyl bromide. Preferred are vinylbenzyl chloride, chloromethyl butadiene and the bromoalkyl esters. Latexes containing these species in copolymerized form are reacted with carbon-containing nucleophiles which are stable in, and can diffuse through, aqueous media having a hetero atom as the center of nucleophilicity wherein each covalent bond of said hetero atom is to a carbon atom.

The nucleophilic compounds which are used advantageously in the practice of this invention are represented by the following classes of compounds, sometimes called Lewis bases:

(a) monobasic aromatic nitrogen compounds;
(b) tetra (lower alkyl) thioureas;
(c) $R_1-S-R_2$ wherein $R_1$ and $R_2$ individually are lower alkyl, hydroxy lower alkyl or wherein $R_1$ and $R_2$ are combined as one alkylene radical having 3 to 5 carbon atoms;
(d)

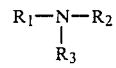

wherein $R_2$ and $R_3$ individually are lower alkyl or hydroxy lower alkyl, or are combined as one alkylene radical having 3 to 5 carbon atoms and $R_1$ is lower alkyl, aralkyl or aryl except when $R_2$ and $R_3$ together are an alkylene radical then $R_1$ is lower alkyl or hydroxy lower alkyl; and (e)

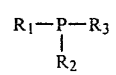

wherein $R_1$, $R_2$ and $R_3$ individually are lower alkyl, hydroxy lower alkyl or aryl.

In this specification, the term "lower alkyl" means an alkyl having from 1 to 4 carbon atoms such as methyl, ethyl, propyl, isopropyl, n-butyl and isobutyl.

Representative specific nucleophilic compounds are pyridine, quinoline, isoquinoline, tetramethyl thiourea, tetraethyl thiourea, hydroxyethylmethyl sulfide, hyroxyethylethyl sulfide, dimethyl sulfide, diethyl sulfide, di-n-propyl sulfide, methyl-n-propyl sulfide, methylbutyl sulfide, dibutyl sulfide, dihydroxyethyl sulfide, bishydroxybutyl sulfide, trimethylene sulfide, thiacyclohexane, tetrahydrothiophene, N-methylpiperidine, N-ethylpyrrolidine, N-hydroxyethylpyrrolidine, trimethylphosphine, triethylphosphine, tri-n-butylphosphine, triphenylphosphine, trimethylamine, triethylamine, tri-n-propylamine, triisobutylamine, hydroxyethyldimethylamine, butyldimethylamine, trihydroxyethylamine and N,N,N-dimethylphenethylamine. Use of the nucleophilic component as the reactant is the preferred route because the monomer containing alkylating sites are less likely to interfere with emulsion polymerization and the coreactant nucleophiles are more water-soluble and blend more readily into the latex. They are also easier to remove in a postreaction clean up and are less toxic than coreactant alkylating agents.

Another general class of reactions suitable for the present process are the reactions of epoxides with nucleophiles and acids as shown below:

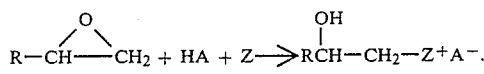

As described earlier, either the epoxide or the nucleophile may be attached to the polymer chain. Epoxide groups can be incorporated into the copolymer by, for example, copolymerization of an unsaturated epoxide such as glycidyl acrylate or methacrylate. Alternatively, the nucleophilic polymers described earlier can be reacted with a lower epoxide such as ethylene oxide, propylene oxide, epichlorohydrin, glycidyl ethers and the like. Suitable acids for either case include HCl, $H_2SO_4$, lower carboxylic acids, etc., and are selected on the basis of the anion desired with the acetate and lactate anions being especially preferred.

The following nonlimiting examples, wherein all parts and percentages are by weight, will serve to illustrate the present invention.

EXAMPLE 1

Preparation of Cationic Interpolymer Surfactants (A) Preparation of Vinyl Soap (VS)

Vinylbenzyl chloride (VBC) is premixed with a dodecyldimethylamine at 1.1/1 stoichiometry and water added at a rate to maintain solution. The reaction is heated to 40° C. while diluting with water. Greater than 95 percent conversion to the vinylbenzyldodecyldimethyl ammonium chloride (VS) resulted in about 1 hour as measured by chloride ion concentration.

(B) Preparation of Reactive Latex

A reactive functional latex is prepared using the following materials and procedure.

| meq $N^+$ | Emulsion Polymerization | | Weight Active | Weight Liquid |
|---|---|---|---|---|
| | Initial Charge: (Heat to approx. 80° C.) | | | |
| | DI Water | | | 204.9 |
| | Con-Add: (Added over ~½ hour) | | | |
| 25.8 | Vinyl Soap (VS) (from "A" above) (30%) | | 9.7 | 32.3 |
| | DI Water | | | 57.6 |
| | 30% $H_2O_2$ | (Aqueous) | | 7.08 |
| | 0.1% $FeCl_3.6\ H_2O$ | | | 4.72 |
| | ml 1N HCl (pH adjustment to ~3.5) | | | 0 |
| | Methyl methacrylate (MMA) | | 47.2 | 47.2 |
| | Vinylbenzyl chloride (VBC) | (Monomer) | 43.1 | 43.1 |
| | 2-Mercaptoethanol | | | 3.07 |
| 25.8 | | | 100.0 | 400.0 |
| | Charge density = 0.258 $N^+$/g solids | 25% max. solids | | |
| | Finishing: (Heated additional ½ hour at approx. 80° C.) | | | |
| | 100% Conversion and no waste. | | | |
| | The degree of polymerization, ($\overline{DP_N}$) = 42. | | | |

(C) Preparation of Interpolymeric Surfactant Modified with Alkyl Side-Chain Hydrophobes

| (Theoretical) | | ONIUM PREPARATION | Weight | Weight |
|---|---|---|---|---|
| meq $N^+$ | meq $S^+$ | Nucleophilic Displacement (3 hr @ 50° C.) | Active | Liquid |
| 25.8 | — | Reactive latex (from "B" above) | 100 | 400 |
| | | DI Water | | 200 |
| | | Dimethyl sulfide (2.5/1 VBC) (excess) | 17.5 | 43.8 |
| | 282 | Vacuum stripped | — | 56.3 |
| 25.8 | 282 | | 117.5 | 587.5 |
| | | (Theory) | 20% Active based on Material Balance | |
| | | 0.220 meq $N^+$/g solids | | |
| | | 2.40 meq $S^+$/g solids | | |
| | | 2.62 meq total onium/g solids | | |
| | | (Actual conversion to oniums 100%) | | |
| | | $\overline{DP_N}$ = 42 | | |
| | | ($\overline{VS_N}$/molecule) = 1.4 | | |
| | | (Average number of side-chain hydrophobes/molecule) | | |

(D) Preparation of Vinyl Soap (VS) of this Invention

To a solution of dimethylaminoethylmethacrylate, dodecylbenzyl chloride, and an equal weight of propanol-2 is slowly added deionized water. The reaction mixture is maintained at about 50° C. while deionized water is added for about 7.5 hours. Conversion of about 93 percent is determined as measured by chloride ion concentration, in the neutral pH range of about 6.5.

(E) Preparation of Reactive Latex
A reactive functional latex of this invention is prepared using the following materials and procedure.
(E) Emulsion Polymerization (F) Preparation of Interpolymeric Surfactant Modified with Aralkyl Side-Chain Hydrophobes

| | ONIUM PREPARATION | | | |
|---|---|---|---|---|
| (Theoretical) | | | Weight | Weight |
| meq $N^+$ | meq $S^+$ | Nucleophilic Displacement (3 hr @ 50° C.) | Active | Liquid |
| 25.8 | — | Reactive latex (from "E" above) | 102 | 510 |
| | | Dimethyl sulfide (2.5/1 VBC) (excess) | 17.5 | 43.8 |
| | | Vacuum stripped | — | −65.8 |
| | 282 | | 119.5 | 488 |
| 25.8 | 282 | (Theory) 25% Active based on Material Balance | | |

0.22 meq $N^+$/g solids
2.36 meq $S^+$/g solids
2.58 meq total onium/g solids
(Actual conversion to oniums more than 95%)

$\overline{DP_N} = 45$ ($\overline{VS_N}$/molecule) = 1 to 2
(Average number of side-chain hydrophobes/molecule)

| meq $N^+$ | Initial Charge: | | Weight Active | Weight Liquid |
|---|---|---|---|---|
| | DI Water | | | 325 |
| 25.8 | Vinyl Soap (VS) (from "D" above) (30%) | | 11.7 | 81.3 |
| | DI Water | | | 57.6 |
| | 30% $H_2O_2$ | (Aqueous) | | 7.08 |
| | 0.1% $FeCl_3.6 H_2O$ | | | 0.472 |
| | ml 1N HCl (pH adjustment to ~3.5) | | | 3 |
| | Methyl methacrylate (MMA) | | 47.2 | 47.2 |
| | Vinylbenzyl chloride (VBC) | (Monomer) | 43.1 | 43.1 |
| | 2-Mercaptoethanol (5 mole percent based on monomer) | | | 3.07 |
| 25.8 | | | 102.0 | 510 |
| | One hour emulsion polymerization at 80° C. | | | |
| | Charge density = 0.253 $N^+$/g solids | 25% max. solids | | |
| | 100% Conversion and no waste. $\overline{DP_N} = 45$ | | | |

TABLE I

Property Comparisons of Surface Activity of Interpolymeric Surfactants as Determined by Surface Tension

| | Reactive Latex Composition (Compositions A–G in weight percent; Composition H in mole percent) | | | | | | | ONIUM DERIVATIVES | | Surface Tension vs. Concentration | |
|---|---|---|---|---|---|---|---|---|---|---|---|
| | | | | | | | | CMC | | | |
| Composition | MMA | VBC | VS | Telogen | Mole % Telogen | $\overline{DP_N}$ | $\overline{VS_N}$/Molecule | dynes/cm | % Solids | dynes/cm | % Solids |
| For Comparison (No side chain hydrophobes as per U.S. Pat. No. 3,963,032) | | | | | | | | | | | |
| A | 50 | 50 | 0 | — | 0 | 157 | 0 | NONE | | 65 | 1.0 |
| | | | | | | | | | | 55 | 10.0 |
| For Comparison - U.S. Pat. Application Ser. No. 272,435 | | | | | | | | | | | |
| B | 47.2 | 43.1 | 9.7* | — | 0 | 140 | 4.6 | 58.3 | 0.21 | 54 | 1.0 |
| | | | | | | | | | | 48 | 10.0 |
| C | 47.2 | 43.1 | 9.7* | $HSC_2H_4OH$ | 5 | 42 | 1.4 | 46.3 | 0.11 | 44 | 1.0 |
| | | | | | | | | | | 38 | 10.0 |
| D | 47.2 | 43.1 | 9.7* | $HSC_2H_4OH$ | 10 | 29 | 1.0 | 50.0 | 0.14 | 45 | 1.0 |
| | | | | | | | | | | 40 | 10.0 |
| For Comparison[1] | | | | | | | | | | | |
| E | — | 100.0 | 0 | — | 0 | 44 | 0 | NONE | | 71 | 1.0 |
| | | | | | | | | | | 54 | 10.0 |
| For Comparison (No side chain hydrophobes as per U.S. Pat. No. 3,963,032) | | | | | | | | | | | |
| | | | | | | | | | | 65 | 1.0 |
| For Comparison - Hydrophobically Modified Polyelectrolytes | | | | | | | | | | | |
| F | — | 90.5 | 9.5* | $HSC_2H_4OH$ | 5 | 52 | 2.2 | 50.8 | 0.12 | 45 | 1.0 |
| | | | | | | | | | | 39 | 10.0 |
| G | — | 90.5 | 9.5* | $HSC_2H_4OH$ | 5 | 52 | 2.2 | 48.9 | 0.21 | 45 | 1.0 |
| | | | | | | | | | | 39 | 10.0 |
| Example of Invention | | | | | | | | | | | |
| H | 60 | 36 | 3.3+ | $HSC_2H_4OH$ | 5 | 45 | 1–2 | 43.5 | 0.30 | 41 | 1.0 |

TABLE I-continued
Property Comparisons of Surface Activity of Interpolymeric Surfactants as Determined by Surface Tension

| | Reactive Latex Composition (Compositions A–G in weight percent; Composition H in mole percent) | | | | | | ONIUM DERIVATIVES | | | |
|---|---|---|---|---|---|---|---|---|---|---|
| | | | | | | | | | Surface Tension vs. | |
| | | | | | | | CMC | | Concentration | |
| Composition | MMA | VBC | VS | Telogen | Mole % Telogen | $\overline{DP}_N$ | $\overline{VS}_N$/Molecule | dynes/cm | % Solids | dynes/cm | % Solids |
| | | | | | | | | | | 35 | 10.0 |

(1)"Cationic Surfactants" by Eric Jungerman, p. 184 (1970), Markel, Dekker. Inc., NY

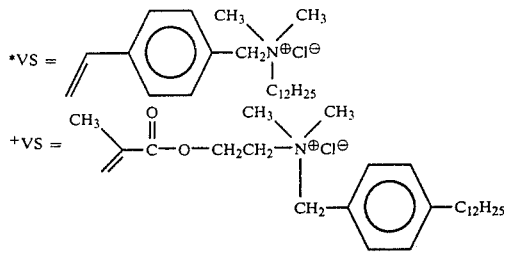

Compositions A and E are prepared by the known organic solution technique using a continuous monomer addition method.

Compositions A and E have onium derivatives:

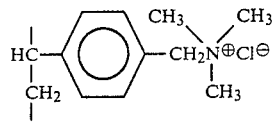

Compositions B, C, D, F and H have onium derivatives:

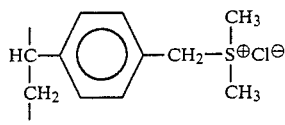

Composition G has onium derivatives:

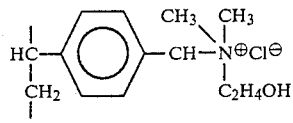

Strauss et al., Ann., NY, *Acad. Sci.*, Vol. 51, pg. 836 (1949), disclosed a series of compounds made by partially quaternizing poly(vinylpyridine) with dodecylbromide, then completing it with ethyl bromide. Composition H is not disclosed and solution properties change significantly only when high levels of side-chain hydrophobes are attached per molecule (~800/molecule). This level is much greater than the unexpected results observed at very low levels (<10-/molecule) which is contemplated by the present invention (e.g. as illustrated in Composition H). The polymers substituted with dodecylbenzyl hydrophobes are more surface active than those substituted with the dodecyl(alkyl) groups.

What is claimed is:

1. A method of reducing the surface tension of an aqueous medium having a polymeric surfactant dissolved therein, said polymeric surfactant (a) being a substantially linear, synthetic, water-soluble cationic interpolymer having a critical micelle concentration of 0.01 to about 10 percent in water at 25° C., a charge density of from about 1 to about 5 meq/g and a number average molecular weight of from about 500 to about 40,000; (b) being derived from the addition polymerization of one or more ethylenically unsaturated monomers and (c) being composed of a plurality of nonionic hydrophobic units and a plurality of pH independent hydrophilic cationic units which are randomly distributed in the backbone of said interpolymeric surfactant; said method comprising the use of the aforementioned type of polymeric surfactant in which a portion of the randomly distributed cationic units thereof contains a hydrophobic substituent thereon, said hydrophobic substituent being an aralkyl group of from 8 to about 20 carbon atoms and said portion of such cationic groups which is so substituted being such that an average of from 1 to about 5 of such hydrophobically substituted cationic groups are present per polymeric surfactant molecule.

2. The method of claim 2 in which the hydrophobic substituent is an aralkyl group which is attached to a nitrogen atom.

3. The method of claim 2 in which the average number of hydrophobically substituted cationic groups per molecule is from 1 to 2.

* * * * *